(12) United States Patent
Hilgendorff et al.

(10) Patent No.: US 10,464,052 B2
(45) Date of Patent: Nov. 5, 2019

(54) OXIDATION CATALYST AND METHOD FOR ITS PREPARATION

(71) Applicant: BASF SE, Ludwigshafen (DE)

(72) Inventors: Marcus Hilgendorff, Hannover Bemerode (DE); Alfred H. Punke, Walle (DE); Torsten Neubauer, Langenhagen (DE); Gerd Grubert, Hannover (DE)

(73) Assignee: BASF SE, Ludwigshafen (DE)

( * ) Notice: Subject to any disclaimer, the term of this patent is extended or adjusted under 35 U.S.C. 154(b) by 582 days.

(21) Appl. No.: 14/076,663

(22) Filed: Nov. 11, 2013

(65) Prior Publication Data
US 2014/0147358 A1 May 29, 2014

Related U.S. Application Data

(60) Provisional application No. 61/725,050, filed on Nov. 12, 2012.

(51) Int. Cl.
*B01J 23/42* (2006.01)
*B01J 29/74* (2006.01)
(Continued)

(52) U.S. Cl.
CPC .......... *B01J 29/7415* (2013.01); *B01D 53/94* (2013.01); *B01D 53/944* (2013.01); *B01J 23/58* (2013.01);
(Continued)

(58) Field of Classification Search
CPC ...... B01J 29/7415; B01J 23/58; B01J 35/023; B01J 23/63; B01J 37/0036; B01J 37/0246;
(Continued)

(56) References Cited

U.S. PATENT DOCUMENTS 5,125,231 A 6/1992 Patil et al.
5,948,377 A 9/1999 Sung
(Continued)

FOREIGN PATENT DOCUMENTS

CN 102137718 A 7/2011
EP 0443765 8/1991
(Continued)

OTHER PUBLICATIONS

PCT International Search Report and Written Opinion in PCT/EP2013/073405, dated Feb. 24, 2014, 14 pages.
(Continued)

*Primary Examiner* — Haytham Soliman
(74) *Attorney, Agent, or Firm* — Oblon, McClelland, Maier & Neustadt, L.L.P.

(57) ABSTRACT

Described is a process for the preparation of a catalyst. The process comprises (i) providing a substrate which is optionally coated with one or more coating layers; (ii) impregnating one or more particulate support materials with one or more platinum group elements; (iii) adding one or more alkaline earth elements and one or more solvents to the product obtained in step (ii) to obtain a slurry; (iv) adjusting the pH of the slurry obtained in step (iii) to a value ranging from 7 to 10 (v) adjusting the pH of the slurry to a value ranging from 2 to 6; (vi) optionally milling the slurry obtained in step (v); (vii) providing the slurry obtained in step (vi) onto the optionally coated substrate in one or more coating steps. Describes is as a catalyst which is obtainable according to said process and its use in the treatment of exhaust gas.

35 Claims, 1 Drawing Sheet

(51) Int. Cl.
*B01D 53/94* (2006.01)
*B01J 37/02* (2006.01)
*B01J 23/58* (2006.01)
*B01J 23/63* (2006.01)
*B01J 35/02* (2006.01)
*B01J 37/00* (2006.01)
B01J 35/00 (2006.01)

(52) U.S. Cl.
CPC ............ *B01J 23/63* (2013.01); *B01J 35/023* (2013.01); *B01J 37/0036* (2013.01); *B01J 37/0244* (2013.01); *B01J 37/0246* (2013.01); *B01J 37/0248* (2013.01); B01D 2255/1021 (2013.01); B01D 2255/1023 (2013.01); B01D 2255/207 (2013.01); B01D 2255/2042 (2013.01); B01D 2255/2063 (2013.01); B01D 2255/2065 (2013.01); B01D 2255/20715 (2013.01); B01D 2255/9022 (2013.01); B01D 2255/9025 (2013.01); B01J 35/0006 (2013.01)

(58) Field of Classification Search
CPC ............... B01J 37/0244; B01J 37/0248; B01J 35/0006; B01D 53/944; B01D 53/94; B01D 2255/1023; B01D 2255/9022; B01D 2255/2065; B01D 2255/2063
USPC .................................. 502/330, 333, 339, 303
See application file for complete search history.

(56) References Cited

U.S. PATENT DOCUMENTS

| | | | |
|---|---|---|---|
| 6,248,688 B1 | 6/2001 | Wu et al. | |
| 2003/0100447 A1* | 5/2003 | Deeba | B01D 53/865 502/339 |
| 2007/0014705 A1 | 1/2007 | Franklin Chen | |
| 2008/0044329 A1* | 2/2008 | Chen | B01D 53/945 423/213.2 |
| 2008/0044330 A1* | 2/2008 | Chen | B01D 53/945 423/213.5 |
| 2009/0193796 A1 | 8/2009 | Wei et al. | |
| 2010/0158780 A1* | 6/2010 | Galligan | B01J 23/002 423/239.1 |
| 2012/0065058 A1* | 3/2012 | Matsueda | B01D 53/945 502/328 |
| 2012/0180464 A1 | 7/2012 | Wei et al. | |

FOREIGN PATENT DOCUMENTS

| | | | |
|---|---|---|---|
| EP | 2 322 274 A1 | 5/2011 | |
| EP | 2322274 | 5/2011 | |
| JP | WO 2010137657 A1 * | 12/2010 | .......... B01D 53/945 |
| WO | WO-2008/002907 | 1/2008 | |
| WO | WO-2010/083313 | 7/2010 | |
| WO | WO-2010/083315 | 7/2010 | |
| WO | WO-2010/083357 | 7/2010 | |
| WO | WO-2010/133309 | 11/2010 | |
| WO | WO 2010133309 A1 * | 11/2010 | ......... B01D 53/9468 |
| WO | WO-2013/151549 | 10/2013 | |
| WO | WO 2014/080200 A1 | 5/2014 | |
| WO | WO 2014/080202 A1 | 5/2014 | |

OTHER PUBLICATIONS

Heck et al, "Diesel Engine Emissions", *Catalytic Air Pollution Control, Commercial Technology*, Second Edition, John Wiley & Sons, Inc. Publication, 2002, p. 186.

\* cited by examiner

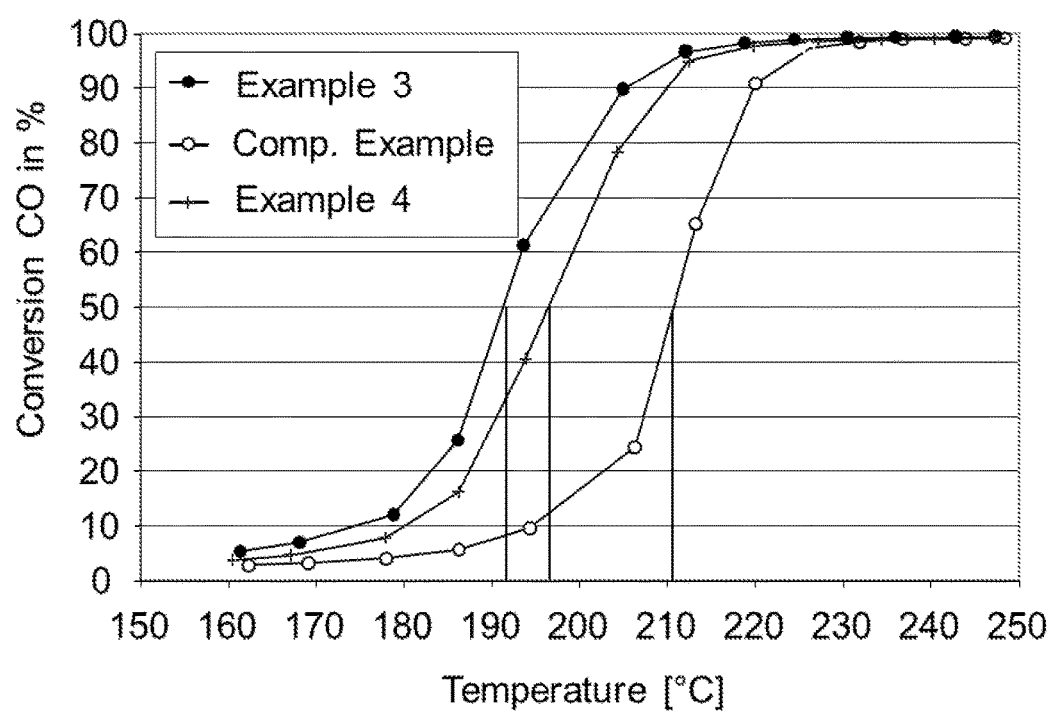

OXIDATION CATALYST AND METHOD FOR ITS PREPARATION

CROSS-REFERENCE TO RELATED APPLICATIONS

This application claims the benefit of priority under 35 U.S.C. § 119(e) to U.S. Provisional Application No. 61/725,050, filed Nov. 12, 2012, the entire content of which is incorporated herein by reference in its entirety.

TECHNICAL FIELD

The present invention relates to a process for the preparation of a catalyst as well as to a catalyst comprising a substrate and a catalyst coating comprising one or more washcoat layers which is obtainable according to the aforementioned process. Furthermore, the present invention relates to the use of a catalyst as obtained or as obtainable according to the inventive process.

BACKGROUND

Operation of lean burn engines, e.g. diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed. From the standpoint of emissions, however, diesel engines present problems more severe than their spark-ignition counterparts. Emission problems relate to particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others.

Oxidation catalysts comprising precious metals such as platinum group metals (PGM) dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a diesel powered engine to treat the exhaust before it vents to the atmosphere. Typically, the diesel oxidation catalysts are formed on ceramic or metallic substrate carriers upon which one or more catalyst coating compositions are deposited. In addition to the conversions of gaseous HC, CO and the soluble organic fraction (SOF) of particulate matter, oxidation catalysts containing platinum group metals dispersed on a refractory oxide support promote the oxidation of nitric oxide (NO) to nitric dioxide ($NO_2$).

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature. In this regard, U.S. Pat. No. 5,125,231 discloses the use of platinum group metaldoped zeolites as low temperature hydrocarbon adsorbents as well as oxidation catalysts.

As discussed hereinabove, oxidation catalysts comprising a platinum group metal (PGM) dispersed on a refractory metal oxide support are known for use in treating exhaust gas emissions from diesel engines. Platinum (Pt) remains the most effective platinum group metal for oxidizing CO and HC in a DOC, after high temperature aging under lean conditions and in the presence of fuel sulfur. Nevertheless, one of the major advantages of using palladium (Pd) based catalysts is the lower cost of Pd compared to Pt. However, Pd based DOCs typically show higher light-off temperatures for oxidation of CO and HC, especially when used with HC storage materials, potentially causing a delay in HC and or CO light-off. Pd containing DOCs may poison the activity of Pt to convert paraffins and/or oxidize NO and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions. As emissions regulations become more stringent, there is a continuing goal to develop diesel oxidation catalyst (DOC) systems that provide improved performance, for example, light-off performance.

One way of achieving higher purification performance of exhaust gas has been to control the cluster size of the precious metal to an optimal size. In particular, according to the supporting method of the precious metal of the prior art which uses a solution of the precious metal compound, the precious metal is adsorbed on the oxide support at an atomic level in which the precious metal compound is dispersed to the surface of the oxide support. However, the atoms of the precious metal move and induce grain growth in the calcination process in which the precious metal is firmly supported. It has therefore been extremely difficult to support only the precious metal of a desired cluster size on the oxide support.

WO 2010/133309 A1 relates to a palladium enriched diesel oxidation catalyst and its application as catalyst for the oxidation of CO and hydrocarbon emissions.

WO 2010/083357 A2 concerns layered diesel oxidation catalyst composites, wherein palladium is segregated from a molecular sieve and in particular from a zeolite in a catalytic material.

WO 2010/083315 A2 concerns a diesel oxidation catalyst with a layered structure for the treatment of exhaust emissions from a diesel engine as well as to a method for treating a diesel exhaust gas stream. In particular, a catalyst structure comprising three distinct layers is disclosed therein, in which the layer comprises a precious metal component such as palladium which is located between two hydrocarbon storage layers comprising a molecular sieve such as a zeolite.

WO 2010/083313 A2 relates to a diesel oxidation catalyst composite with a layer structure comprising at least two distinct layers, at least one of which contains an oxygen storage component that is present in a layer separate from the majority of the platinum group metal components such as palladium and platinum.

WO 2008/002907 A2 concerns a diesel exhaust treatment system wherein an oxygen storage component is utilized and degradation of the oxygen storage component is correlated with the degradation of the hydrocarbon conversion efficiency of a catalyst in a diesel engine system.

However, these prior art diesel oxidation catalysts still show unsatisfactory breakthrough of hydrocarbons and carbon monoxide. Furthermore, the hydrocarbon storage capacity of selected diesel oxidation catalysts of the prior art is enhanced at the expense of the catalytic activity of the catalyst.

SUMMARY

A first aspect of the invention is directed to a process for the preparation of a catalyst. In a first embodiment, the process comprises (i) providing a substrate which is optionally coated with one or more coating layers; (ii) impregnating one or more particulate support materials with one or more platinum group elements; (iii) adding one or more alkaline earth elements and one or more solvents to the product obtained in step (ii) to obtain a slurry; (iv) adjusting the pH of the slurry obtained in step (iii) to a value comprised in the range of from 7 to 10, in case the pH should not fall within this range; (v) adjusting the pH of the slurry to a value comprised in the range of from 2 to 6; (vi) optionally milling the slurry obtained in step (v); (vii) providing the slurry obtained in step (vi) onto the optionally coated substrate in one or more coating steps.

In a second embodiment, the process of the first embodiment is modified, wherein the impregnation in step (ii) is achieved by incipient wetness.

In a third embodiment, the process of the first through second embodiments is modified, wherein the one or more coating layers on the substrate provided in step (i) comprise one or more washcoat layers.

In a fourth embodiment, the process of the first through third embodiments is modified, wherein the one or more particulate support materials is selected from the group consisting of alumina, titania, titania-alumina, zirconia, zirconia-alumina, baria-alumina, ceria, ceria-alumina, baria-ceria-alumina, lanthana-alumina, lanthana-zirconia-alumina, titania-zirconia, zeolites, and mixtures of two or more thereof.

In a fifth embodiment, the process of the first through fourth embodiments is modified, wherein the one or more platinum group elements impregnated onto the support materials in step (ii) is/are selected from the group consisting of Ru, Rh, Pd, Os, Ir, Pt, and combinations of two or more thereof.

In a sixth embodiment, the process of the first through fifth embodiments is modified, wherein the one or more alkaline earth elements added in step (iii) is/are selected from the group consisting of Mg, Ca, Sr, Ba, and combinations of two or more thereof.

In a seventh embodiment, the process of the first through sixth embodiments is modified, wherein the one or more solvents added in step (iii) comprise water.

In an eighth embodiment, the process of the first through seventh embodiments is modified, wherein one or more further platinum group elements is/are added after step (iv) and prior to step (v).

In a ninth embodiment, the process of the first through eighth embodiments is modified, wherein in step (iv) the pH is adjusted to a value comprised in the range of from 7.5 to 9.

In a tenth embodiment, the process of the first through ninth embodiments is modified, wherein in step (iv) the pH is adjusted by addition of one or more bases.

In an eleventh embodiment, the process of the first through tenth embodiments is modified, wherein the pH in step (v) is adjusted to a value comprised in the range of from 3 to 5.

In a twelfth embodiment, the process of the first through eleventh embodiments is modified, wherein in step (v) the pH is adjusted by addition of one or more acids.

In a thirteenth embodiment, the process of the twelfth embodiment is modified, wherein the one or more acids comprise one or more monocarboxylic acids selected from the group consisting of optionally substituted and/or optionally branched ($C_1$-$C_{10}$) carboxylic acids and mixtures of two or more thereof.

In a fourteenth embodiment, the process of the twelfth and thirteenth embodiments is modified, wherein the one or more acids comprise one or more dicarboxylic acids selected from the group consisting of ($C_2$-$C_{10}$) dicarboxylic acids and mixtures of two or more thereof.

In a fifteenth embodiment, the process of the fourteenth embodiment is modified, wherein the one or more dicarboxylic acids are substituted with one or more substituents selected from the group consisting of ($C_1$-$C_3$)alkyl, ($C_1$-$C_3$) alkoxy, hydroxyl, halides, ($C_1$-$C_3$)carbonyl, ($C_1$-$C_3$)amine, and combinations of two or more thereof.

In a sixteenth embodiment, the process of the first through fifteenth embodiments is modified, wherein one or more alkaline earth elements are further added in step (v).

In a seventeenth embodiment, the process of the first through sixteenth embodiments is modified, wherein the molar ratio of the total amount of the one or more platinum group elements added in step (ii) and optionally added in step (iii), to the total amount of the one or more alkaline earth elements added in step (iii), and optionally added in steps (iv) and/or (v) is comprised in the range of from 1:(0.1-10).

In an eighteenth embodiment, the process of the first through seventeenth embodiments is modified, wherein the slurry obtained in step (v) is milled in step (vi) to a particle size in the range of from 1 to 50 µm.

In a nineteenth embodiment, the process of the first through eighteenth embodiments is modified, wherein a step of drying and/or a calcination step is conducted after step (vii).

In a twentieth embodiment, the process of the first through nineteenth embodiments is modified, wherein steps (ii) to (vii) are repeated one or more times for providing the optionally coated substrate of step (i) with two or more washcoat layers.

In a twenty-first embodiment, the process of the first through twentieth embodiments is modified, wherein the optionally coated substrate provided in step (i) is a monolith substrate.

A second aspect of the invention is direct to a catalyst. In a twenty-second embodiment, a catalyst comprises a substrate and a catalyst coating comprising one or more washcoat layers, said catalyst coating being provided on said substrate, wherein the catalyst is obtainable and/or obtained according to the first through twenty-first embodiments.

In a twenty-third embodiment, the catalyst of the twenty-second embodiment is modified, wherein the one or more washcoat layers respectively contain one or more particulate support materials each loaded with both one or more platinum group elements and with one or more alkaline earth elements.

In a twenty-fourth embodiment, the catalyst of the twenty-second and twenty-third embodiments is modified, wherein the molar ratio of the total amount of the one or more platinum group elements to the total amount of the one or more alkaline earth elements respectively supported on the one or more particulate support materials is comprised in the range of from 1:(0.1-10).

In a twenty-fifth embodiment, the catalyst of the twenty-second through twenty-fourth embodiments is modified, wherein the one or more platinum group elements supported on the one or more particulate support materials is selected from the group consisting of Ru, Rh, Pd, Os, Ir, Pt, and combinations of two or more thereof.

In a twenty-sixth embodiment, the catalyst of the twenty-second through twenty-fifth embodiments is modified, wherein the one or more alkaline earth elements supported on the one or more particulate support materials is selected from the group consisting of Mg, Ca, Sr, Ba, and combinations of two or more thereof.

In a twenty-seventh embodiment, the catalyst of the twenty-second through twenty-sixth embodiments is modified, wherein the one or more particulate support materials loaded with both one or more platinum group elements and with one or more alkaline earth elements is selected from the group consisting of alumina, titania, titania-alumina, zirconia, zirconia-alumina, baria-alumina, ceria, ceria-alumina, baria-ceria-alumina, lanthana-alumina, lanthana-zirconia-alumina, titania-zirconia, zeolites, and mixtures of two or more thereof.

In a twenty-eighth embodiment, the catalyst of the twenty-second through twenty-seventh embodiments is modified, wherein the total amount of the one or more platinum group elements loaded on the one or more particulate support materials contained in the one or more washcoat layers is comprised in the range of from 0.5 to 300 g/ft$^3$.

In a twenty-ninth embodiment, the catalyst of twenty-third through twenty-eighth embodiments is modified, wherein the total amount of the one or more alkaline earth elements loaded on the one or more particulate support materials contained in the one or more washcoat layers is comprised in the range of from 0.001 to 0.3 g/in$^3$.

In a thirtieth embodiment, the catalyst of the twenty-second through twenty-ninth embodiments is modified, wherein the average particle size of the one or more particulate support materials loaded with both one or more platinum group elements and with one or more alkaline earth elements is comprised in the range of from 1 to 50 μm.

In a thirty-first embodiment, the catalyst of the twenty-second through thirtieth embodiments is modified, wherein the catalyst coating comprises two or more washcoat layers respectively containing the one or more particulate support materials loaded with both one or more platinum group elements and with one or more alkaline earth elements.

In a thirty-second embodiment, the catalyst of the thirty-first embodiment is modified, wherein the catalyst coating comprises a first washcoat layer comprising Pd, and a second washcoat layer provided thereon comprising Pt and Pd.

In a thirty-third embodiment, the catalyst of the thirty-second embodiment is modified, wherein the catalyst coating further comprises a third washcoat layer comprising Pd provided on the first and second washcoat layers.

In a thirty-fourth embodiment, the catalyst of the twenty-second through thirty-third embodiments is modified, wherein the catalyst substrate is a monolith substrate.

A third aspect of the invention relates to the use of the catalyst as a catalyst for the treatment of exhaust gas. A thirty-fifth embodiment is directed to a method of treating exhaust gas, the method comprising treating an exhaust gas stream with a catalyst according to the twenty-second through thirty-fourth embodiments.

BRIEF DESCRIPTION OF DRAWINGS

FIG. 1 displays results from light-off testing with respect to the conversion of CO in exhaust gas using catalyst samples as obtained from Examples 3 and 4 and the Comparative Example, which have been subject to an ageing procedure.

DETAILED DESCRIPTION

Provided is an oxidation catalyst with a layered structure which continually supports the oxidation and abatement of carbon monoxide and unburned hydrocarbons and thus allows for a minimum breakthrough of hydrocarbons and carbon monoxide in particular during prolonged use thereof. In particular, provided is an oxidation catalyst which, due to the rarity and, consequently, the costs of precious metal components usually used for the preparation of oxidation catalysts and, in particular, diesel oxidation catalysts, contains a reduced amount of platinum in the catalyst composition allowing for reduced costs without reducing the catalytic efficiency.

Thus, it has surprisingly been found that by applying a specific process for the preparation of a catalyst, in particular relative to the steps of supporting one or more platinum group elements on to a particulate support material, an improved dispersion of said platinum group elements may be achieved which is sustained during use thereof, thus leading to a better performance of the resulting catalyst. Furthermore, it has quite unexpectedly been found that such an improved catalyst may be obtained by a facile procedure such that the improvements in performance may be achieved in a highly cost efficient manner. More specifically, it has quite surprisingly been found that an improved dispersion and fixation of PGM on a particulate support material may be achieved by using very low amounts of alkaline earth elements and/or by applying the PGM to the particulate support material according to a specific process according to the present invention, and in particular according to particular and specific embodiments thereof as described in the present application.

Therefore, the present invention relates to a process for the preparation of a catalyst. In one or more embodiments, the process comprises:
(i) providing a substrate which is optionally coated with one or more coating layers;
(ii) impregnating one or more particulate support materials with one or more platinum group elements;
(iii) adding one or more alkaline earth elements and one or more solvents to the product obtained in step (ii) to obtain a slurry;
(iv) adjusting the pH of the slurry obtained in step (iii) to a value comprised in the range of from 7 to 10, in case the pH should not fall within this range;
(v) adjusting the pH of the slurry to a value comprised in the range of from 2 to 6;
(vi) optionally milling the slurry obtained in step (v);
(vii) providing the slurry obtained in step (vi) onto the optionally coated substrate in one or more coating steps.

As regards the substrate which may be employed in the process of the present invention and which may be contained in the inventive catalyst, no particular restriction applies such that in principle any suitable type of substrate may be provided in step (i). In particular, this applies both with respect to the type of material or materials from which the substrate is made of as well as with respect to the dimensions and further characteristics of the substrate such as its porosity and with respect to embodiments employing a honeycomb-type substrate with respect to the geometry and density of the cells as well as regarding the question as to whether a flow-through or a wall-flow substrate is chosen. According to specific embodiments of the present invention, the substrate provided in step (i) is a monolith substrate, which according to further specific embodiments may be a flow-through or a wall-flow monolith substrate. According to particularly specific embodiments, a flow-through monolith substrate is employed in the inventive process, wherein the monolith substrate is specifically a honeycomb substrate.

Honeycomb substrates used as the wall-flow or flow-through monolith substrate provided in step (i), and more specifically as the flow-through monolith substrate in said step of the inventive process, have a plurality of fine, substantially parallel flow passages extending along the longitudinal axis of the substrate.

Each passage may be blocked at one end of the substrate body, with alternate passages blocked at opposite end-faces in the case of the wall-flow substrates which may be employed. Such monolithic carriers may contain up to about 400 flow passages (or "cells") per square inch ($(2.54\ cm)^2$) of cross section, although far fewer may be used. For example, the carrier may have from 7 to 400, specifically from 100 to 400, cells per square inch ("cpsi"). The cells can have cross sections that are rectangular, square, circular, oval, triangular, hexagonal, or are of other polygonal shapes.

Specific monolithic and, in particular, honeycomb substrates are composed of ceramic-like materials such as cordierite, alpha-alumina, silicon carbide, silicon nitride, zirconia, mullite, spodumene, alumina-silica-magnesia or zirconium silicate, or of refractory metals such as stainless steel. Specific wall flow substrates are formed from cordierite and silicon carbide. Such materials are able to withstand the environment, particularly high temperatures, encountered in treating the exhaust streams. Ceramic wall flow substrates used are typically formed of a material having a porosity of 30 to 80%. As used herein, the term "porosity" is understood as being determined according to mercury porosity measurement according to DIN 66133. According to the present invention, wall flow substrates have a porosity in the range from 40 to 70%, more specifically of 45 to 65% and even more specifically of 50 to 60%.

In one or more embodiments, the carrier substrate comprises a material selected from the group consisting of cordierite, cordierite-alumina, silicon nitride, silicon carbide, zircon mullite, spodumene, alumina-silica magnesia, zircon silicate, sillimanite, magnesium silicate, zircon, petalite, alumina, alumosilicate and combinations of two or more thereof, more specifically from the group consisting of cordierite, silicon nitride, silicon carbide, and combinations of two or more thereof. According to particularly specific embodiments of the present invention, the substrate provided in step (i) of the inventive process and comprised in the inventive catalyst comprises cordierite and specifically consists of cordierite.

Therefore, according to specific embodiments of the inventive process, the optionally coated substrate provided in step (i) is a monolith substrate, specifically a flow-through or wall-flow monolith substrate, more specifically a flow-through monolith substrate, wherein the monolith substrate is specifically a honeycomb substrate.

As regards the one or more coating layers which may be optionally contained on the substrate provided in step (i) of the inventive process, there is principally no restriction as to the type of number of coating layers which may already be contained on the substrate when employed in the inventive process for the preparation of a catalyst. Thus, according to embodiments of the present invention wherein the substrate provided in step (i) is coated with one or more coating layers, any conceivable number of coating layers may have been provided thereon, provided that depending on the umber and the thickness of the one or more coating layers these allow for the further coating of the substrate in accordance with any one of the particular or specific embodiments of the inventive process as defined in the present application. This applies, in particular, relative to the use of flow-through or wall-flow monolithic substrates in particular of the honeycomb type such that the number and/or the thickness of the optional one or more coating layers contained on the substrate provided in step (i) must allow for the further coating thereof, in particular considering the application of the inventive catalyst as a flow-through or wall-flow catalyst and in particular as a wall-flow catalyst.

Concerning the type of the one or more optional coating layers contained on the substrate provided in step (i) of the inventive process, these may comprise a composition as provided in a base coating or the like which is devoid of a catalytic component and in particular of a platinum group element or may also comprise one or more catalytically active components such as one or more platinum group elements and/or one or more oxygen storage components. With respect to embodiments wherein two or more coating layers are contained on the substrate provided in step (i), said two or more coating layers may have the same composition and/or comprise two or more layers having different compositions. Same applies accordingly with respect to the amount in which the one or more coating layers may be contained on the substrate provided in step (i) of the inventive process.

As regards the characteristics of the one or more coating layers which may be contained on the substrate provided in step (i), again no restrictions apply such that said one or more layers may display any suitable physical properties and in particular any suitable roughness and/or porosity. It is, however, specific according to the inventive process that the one or more coating layers contained on the substrate provided in step (i) are of a porous nature and in particular of a porous nature as may be achieved in a washcoat layer. Consequently, it is particularly specific according to the present invention that the one or more coating layers on the substrate provided in step (i) comprise one or more washcoat layers.

According to alternatively specific embodiments of the inventive process, however, the substrate provided in step (i) is an uncoated substrate such that the initial slurry provided on said substrate according to the inventive process constitutes the first coating layer of the resulting catalyst.

In step (ii) of the inventive process, one or more particulate support materials are impregnated with one or more platinum group elements. As regards the impregnation procedure which may be employed for achieving the impregnation of said one or more particulate support materials in step (ii), any suitable impregnation procedure may be employed provided that the impregnation of the one or more platinum group elements may be achieved. Thus, by way of example, said impregnation may be realized by contacting the one or more particulate support materials with a solution comprising the one or more platinum group elements. In the event that two or more particulate support materials are employed, the impregnation procedure may be applied to the individual particulate support materials in separate steps or to the two or more particulate support materials in a single impregnation procedure. Same applies relative to particular embodiments of the present invention wherein two or more platinum group elements are impregnated on to the one or more particulate support materials in step (ii), such that the two or more platinum group elements may be impregnated on to the particulate support material using individual solutions containing the individual platinum group elements, or using a solution containing two or more of the platinum group elements in a single impregnation step. According to particular embodiments of the inventive process wherein two or more particulate support materials are impregnated with two or more platinum group elements, any combination of the aforementioned possibilities may be employed for supporting the two or more platinum group elements either on the same or on different types of particulate support materials.

As regards the embodiments of the inventive process wherein the impregnation of the one or more particulate support materials with the one or more platinum group elements in step (ii) is achieved by using one or more solutions containing said one or more platinum group elements, there is no particular restriction as to the type of solution and in particular the type of solvent system which is employed provided that it is suitable for dissolving one or more of the platinum group elements and allows for the deposition thereof on to the one or more particulate support materials during impregnation thereof. Furthermore, any suitable concentration of the one or more platinum group elements in said one or more solutions may be accordingly employed depending on the desired loading to be achieved on the one or more particulate support materials. According to particularly specific embodiments of the present invention, however, at least a portion of the one or more platinum group elements and specifically all of the one or more platinum group elements are impregnated on to the one or more particulate support materials by employing a limited amount of one or more solutions of the one or more platinum group elements such that said one or more solutions are entirely absorbed by the one or more particulate support materials by capillary force, i.e. by incipient wetness.

Therefore, according to particularly specific embodiments of the inventive process, the impregnation in step (ii) is achieved by incipient wetness.

According to the present invention, there is no particular restriction as to how the one or more platinum group elements are supported on the one or more particulate support materials such that in principle any suitable degree of interaction between the one or more particulate support materials and the one or more platinum group elements may be chosen. Thus, the one or more platinum group elements may be brought onto the one or more particulate support materials by simple impregnation according to step (ii) of the inventive process. According to the present invention the interaction of the one or more platinum group elements with the one or more particulate support materials may be increased by one or more additional treatment steps during which the physical and/or chemical interaction of the former is increased. According to specific embodiments of the present invention wherein the interaction of the one or more platinum group elements and the one or more particulate support materials is increased, this may be achieved by any conceivable method, such that in principle any suitable treatment for the fixation of the one or more platinum group elements onto the one or more particulate support materials may be applied. Specifically, however, the fixation is achieved by a chemical and/or thermal treatment of the one or more platinum group elements supported onto the one or more particulate support materials, wherein it is further specific according to the inventive process that the one or more platinum group elements are thermally fixed onto the one or more particulate support materials.

Concerning the specific thermal fixation of the one or more platinum group elements onto the one or more particulate support materials, there is no restriction according to the present invention, neither as to the type of method which may be applied for achieving such a thermal fixation, nor as to the point of the inventive process at which said thermal fixation may be conducted, provided that the one or more platinum group elements has been supported onto the one or more particulate support materials by impregnation according to step (ii) of the inventive process. Thus, in principle, thermal fixation of the one or more platinum group elements onto the one or more particulate support materials may be achieved by any suitable thermal treatment of the impregnated particulate support materials wherein no general restriction applies neither with respect to the temperature, not with respect to the duration of the thermal treatment, provided that an increase in fixation of the one or more platinum group elements, i.e. an increase in the physical and/or chemical interaction thereof with the one or more particulate support material is achieved. Accordingly, thermal fixation may be achieved at any suitable temperature, wherein thermal fixation is achieved by heating of the one or more impregnated support materials at a temperature ranging anywhere from 250 to 850° C., and more specifically at a temperature ranging from 300 to 750° C., more specifically from 400 to 700° C., more specifically from 500 to 660° C., more specifically from 550 to 630° C., and more specifically from 570 to 610° C. Concerning the duration of the thermal treatment, again no particular restriction applies such that by way of example the thermal treatment for fixation of the one or more platinum group elements onto the one or more particulate support materials may be conducted for a period ranging anywhere from 0.1 to 20 h, wherein specifically the thermal treatment is conducted for a duration ranging from 0.3 to 10 h, more specifically from 0.5 to 5 h, more specifically from 1.0 to 3 h, more specifically from 1.5 to 2.5 h, and more specifically from 1.8 to 2.2 h.

With respect to the stage of the inventive process at which the specific thermal fixation of the one or more platinum group elements onto the one or more particulate support materials is conducted, this step may be performed either directly after impregnation according to step (ii), or at a later stage such as e.g. after step (v), (Vi), or (vii) of the inventive process. According to the inventive process it is however specific that the specific thermal fixation is performed after step (ii) and prior to step (iii). However, when no thermal fixation is performed after step (ii) and prior to step (iii), thermal fixation is conducted after step (vii) of the inventive process and in particular by drying and/or calcination according to the particular and specific embodiments of the inventive process as described in the present application.

Therefore, it is further specific according to the inventive process that after step (ii) and prior to step (iii) the one or more platinum group elements impregnated onto the one or more particulate support materials are subject to thermal fixation, specifically by heating of the one or more impregnated support materials at a temperature of from 250 to 850° C.

Regarding the one or more particulate support materials employed in step (ii) of the inventive process, no particular restriction applies in their respect neither concerning the type or number of different support materials which may be employed, nor with respect to the amount in which they may be used provided that they are suitable for supporting one or more of the platinum group elements and that the resulting material is suitable for the preparation of a catalyst according to the inventive process. According to particular embodiments thereof, the one or more particulate support materials comprise one or more particulate metal oxides and in particular one or more particulate metal oxides having a high surface area, wherein specifically said one or more high surface area metal oxides display a high thermal resistance such as found in high surface area refractory metal oxides known in the art. Thus, according to the present invention, the one or more particulate support materials is selected from the group consisting of alumina, titania, titania-alumina, zirconia, zirconia-alumina, baria-alumina, ceria, ceria-alumina, bariaceria-alumina, lanthana-alumina, lanthana-zirconia-alumina, titania-zirconia, zeolites, and mixtures of two or more thereof. According to said embodiments it is further specific that the one or more particulate support materials comprise alumina and/or a zeolite. As regards the alumina specifically used as the one or more particulate support material, any suitable type of alumina may be employed such as alpha-alumina, beta-alumina, and/or gamma-alumina, wherein specifically gamma-alumina is comprised in the one or more particulate support materials. Same applies accordingly relative to the zeolite which is specifically comprised in the one or more particulate support materials, such that in principle any conceivable one or more zeolites may be comprised in the one or more particulate support materials provided that the resulting impregnated zeolite is suitable for obtaining a catalyst according to the inventive process. According to the present invention it is however specific that one or more zeolites are employed which display a high thermal stability wherein according to particularly specific embodiments, the one or more zeolites which may be comprised in the one or more particulate support materials comprise one or more zeolites of the BEA-structure type, and in particular zeolite beta.

In view of the specific thermostability of the one or more particulate support materials employed in step (ii) of the inventive process, according to particularly specific embodiments thereof, one or more of the particulate support materials and in particular one or more of the particulate support materials according to any of the particular and specific embodiments of the present invention are specifically doped with one or more compounds for improving their thermal stability. Consequently, it is particularly specific that the one or more particulate support materials are doped with one or more compounds, said one or more compounds specifically being selected from the group consisting of titania, zirconia, ceria, lanthana, silica, and mixtures of two or more thereof, more specifically from the group consisting of zirconia, lanthana, silica, and mixtures of two or more thereof. According to particularly specific embodiments of the present invention, one or more of the particulate support materials provided in step (ii) is doped with silica. As regards the type of the one or more particulate support materials specifically doped with one or more of the aforementioned doping compounds, again no particular restriction applies provided that an increase in thermal stability thereof is achieved by its doping, in particular with one or more of the aforementioned doping compounds. According to particularly specific embodiments, the one or more particulate support materials doped with one or more of the aforementioned compounds are selected from the group consisting of alumina, titania, zirconia, ceria, zeolites, and mixtures of two or more thereof, wherein more specifically the one or more particulate support materials are selected from the group consisting of alumina, ceria, zeolites, and mixtures of two or more thereof. According to particularly specific embodiments, the one or more particulate support materials doped with one or more of the aforementioned compounds comprises alumina and even more specifically wherein said alumina is doped with silica, wherein even more specifically said alumina is gamma-alumina doped with silica.

Thus, according to specific embodiments of the present invention, the one or more particulate support material is selected from the group consisting of alumina, titania, titania-alumina, zirconia, zirconia-alumina, baria-alumina, ceria, ceria-alumina, baria-ceria-alumina, lanthana-alumina, lanthana-zirconia-alumina, titania-zirconia, zeolites, and mixtures of two or more thereof, wherein the one or more particulate support materials specifically comprise alumina and/or a zeolite, more specifically gamma-alumina and/or zeolite beta, and even more specifically comprise gamma-alumina doped with $SiO_2$.

As regards particularly specific particulate support materials which have been doped according to any of the particular or specific embodiments of the present invention, no particular restriction applies relative to the amount in which the one or more doping compounds may be contained therein provided that a particulate support material suitable for use in the inventive process may be obtained. Thus, by way of example, the amount of the doping compound contained in the one or more specific particulate support materials may range anywhere from 0.1 to 30 wt.-% based on the total amount of the one or more doping compounds and the particulate support material in which they are contained, wherein specifically the amount of the doping compound ranges from 0.1 to 30 wt.-%, more specifically from 0.5 to 20 wt.-%, more specifically from 1 to 15 wt.-%, more specifically from 2 to 10 wt.-%, and even more specifically from 3 to 8 wt.-%. According to particularly specific embodiments thereof, the amount of the one or more doping compounds contained in one or more of the particulate support materials ranges from 4 to 6 wt.-% based on the total amount of the one or more doping compounds and the particulate support material in which they are contained.

Concerning the one or more platinum group elements impregnated on to the one or more particulate support materials in step (ii), it is noted that according to the present invention the term "platinum element" specifically refers to the elements ruthenium, rhodium, palladium, osmium, iridium, and platinum. Thus, according to specific embodiments of the inventive process, the one or more platinum group elements impregnated on to the one or more support materials are selected from the group consisting of ruthenium, rhodium, palladium, osmium, iridium, platinum, and combinations of two or more thereof. According to particularly specific embodiments thereof, the one or more platinum group elements comprise palladium and/or platinum wherein even specifically the one or more platinum group elements consist of palladium and/or platinum. According to particularly specific embodiments of the inventive process, the one or more platinum group elements impregnated on to the support materials in step (ii) comprise palladium and even more specifically consist of palladium.

Therefore, embodiments of the inventive process are specific, wherein the one or more platinum group elements impregnated onto the support materials in step (ii) is/are selected from the group consisting of Ru, Rh, Pd, Os, Ir, Pt, and combinations of two or more thereof.

Concerning the one or more platinum group elements impregnated on to the one or more support materials, there is no particular restriction as to the form in which said one or more platinum group metals are employed for said impregnation step provided that an impregnated material may be obtained. Thus, the one or more platinum group elements may be employed as such, i.e. in the form of the metal, and/or in the form of one or more compounds comprising one or more of the platinum group elements. According to specific embodiments and, in particular according to embodiments wherein the step of impregnation is performed with the aid of one or more solutions of the one or more platinum group elements, the one or more platinum group metals are provided in the form of a salt and in particular in the form of a salt including salts of a complex of one or more of the platinum group elements, wherein said salt or complex salt is at least in part soluble in the solvent system used according to said specific embodiments.

According to step (iii) of the inventive process, one or more alkaline earth elements and one or more solvents are added to the product obtained in step (ii) for obtaining a slurry. Concerning the one or more alkaline earth elements which are added in step (iii), these are specifically selected from the group consisting of magnesium, calcium, strontium, barium, and combinations of any two or more thereof. However, according to particularly specific embodiments of the inventive process, the one or more alkaline earth elements added in step (iii) comprise at least barium wherein it is even more specific that barium is added as the alkaline earth element in step (iii).

Therefore, embodiments of the inventive process are specific, wherein the one or more alkaline earth elements added in step (iii) is/are selected from the group consisting of Mg, Ca, Sr, Ba, and combinations of two or more thereof.

With respect to the one or more solvents employed in step (iii) for obtaining a slurry, any suitable solvent may be employed to this effect provided that a pH value may be determined for the resulting slurry. Thus, according to specific embodiments of the inventive process, the one or more solvents added in step (iii) comprise water. According to said specific embodiments, there is no particular restriction as to the amount of water comprised therein relative to one or more further solvents other than water which may be equally contained therein provided again that a pH value may be obtained for the resulting slurry. It is, however, particularly specific according to the present invention that water and specifically distilled water is used as the one or more solvents in step (iii) of the inventive process.

Therefore, according to specific embodiments of the inventive process, the one or more solvents added in step (iii) comprise water, specifically distilled water.

According to step (iv) of the inventive process, the pH of the slurry obtained in step (iii) is adjusted to a value comprised in the range of from 7 to 10. In particular, according to embodiments of the present invention wherein the slurry obtained in step (iii) already displays a pH in the range of from 7 to 10, it is not necessary that the pH be adjusted prior to performing step (v) wherein the pH is adjusted to a value comprised in the range of from 2 to 6. Same applies accordingly for any of the particular and specific embodiments of the present invention as defined in the present application wherein the adjustment of the pH of the slurry obtained in step (iii) to a specific value contained in the range of from 7 to 10 is specific provided that the slurry obtained in step (iii) already displays said specific pH value. Thus, according to specific embodiments of the inventive process, the pH in step (iv) is adjusted to a value comprised in the range of from 7.5 to 9 and more specifically to a pH in the range of from 7.5 to 8.5. According to a particularly specific embodiment thereof, the pH of the slurry obtained in step (iii) is adjusted to a value comprised in the range of from 7.8 to 8.2 in step (iv) of the inventive process. Accordingly, should the pH of the slurry obtained in step (iii) display a value comprised in the specific and particularly specific pH ranges for step (iv) as defined in the present application, it is accordingly not necessary to adjust the pH in a step (iv) prior to performing step (v) of the inventive process.

Therefore, embodiments of the inventive process are specific, wherein in step (iv) the pH is adjusted to a value comprised in the range of from 7.5 to 9.

With respect to the pH value determined for the slurry in any of the steps of the inventive process and in particular in steps (iv) and (v) of the inventive process, there is no particular restriction which would apply relative to the particular method for its determination. Thus, any suitable means for determining the pH of the slurries may be employed provided these are suited for affording a pH value comprised within any of the particular or specific pH ranges as defined in the present application. According to particularly specific embodiments of the inventive process, however, the pH of the slurry is determined with the aid of a glass electrode, and specifically using a glass electrode, specifically using a calibrated and temperature-compensated galls electrode. According to particularly specific embodiments of the present application, the pH is measured with a commercially available glass electrode which has been calibrated beforehand against buffer of a known pH. All pH data is specifically based on a measurement with a calibrated and temperature-compensated glass electrode. If the calibration temperature differs from the measurement of temperature, temperature compensation is used. This definition and this procedure correspond to the currently valid IUPAC recommendation (R. P. Buck et al., *Pure and Applied Chemistry* (2002) 74(11), pp. 2169-2200 and in particular section 11 therein).

As regards the means for adjusting the pH of the slurry in step (iv) of the inventive process, no particular restrictions apply as to the means which may be employed for adjusting the pH. Thus, in principle, any conceivable pH modifying agent and/or means and in particular any pH modifying compound specifically comprising one or more acids and/or bases may be added to the slurry obtained in step (iii) to this effect. As regards the acids and/or bases specifically employed to this effect, these may be acids and bases of the Lewis and/or Bronsted type, wherein specifically the one or more acids and/or bases used for adjustment of the pH in step (iv) are selected from Bronsted acids and/or bases. According to particular embodiments of the present invention wherein the pH of the slurry obtained in step (iii) displays a pH below 7, the pH is adjusted by the addition of one or more bases selected from alkaline earth metal hydroxides and mixtures of two or more thereof. According to specific embodiments thereof, the alkaline earth metals are selected from the group consisting of magnesium, calcium, strontium, barium, and combinations of two or more thereof. According to particularly specific embodiments of the present invention, the pH of the slurry obtained in step (iii) is adjusted in step (iv) by addition of one or more bases including barium hydroxide, wherein even more specifically barium hydroxide is used as the base for adjusting the pH according to any of the particular and specific embodiments of the inventive process.

Therefore, embodiments of the inventive process are specific according to the present invention wherein in step (iv) the pH is adjusted by addition of one or more bases.

According to the inventive process, the pH of the slurry is subsequently adjusted to a value comprised in the range of from 2 to 6 in step (v). It is, however, specific according to the present invention that one or more platinum group elements further to those which have been impregnated into the one or more particulate support materials in step (ii) are added after step (iv) and prior to step (v), i.e. to the slurry having a pH comprised in the range of from 7 to 10 according to any of the particular and specific embodiments of the inventive process. As regards the one or more further platinum group elements which are specifically added after step (iv), no particular restriction applies according to the present invention, neither with respect to the type of the one or more further platinum group elements nor regarding the amounts in which said one or more further platinum group elements are further added to the slurry. Thus, the one or more further platinum group elements added after step (iv) and prior to step (v) may be selected from the group consisting of ruthenium, rhodium, palladium, osmium, iridium, platinum, and combinations of any two or more thereof, wherein specifically the one or more further platinum group elements comprise palladium and/or platinum. According to particularly specific embodiments, palladium and/or platinum are added as the further platinum group elements after step (iv) and prior to step (v), wherein according to particularly specific embodiments platinum is further added as the further platinum group element.

Therefore, embodiments of the inventive process are further specific, wherein one or more further platinum group elements is/are added after step (iv) and prior to step (v).

As regards the pH to which the slurry is adjusted in step (v) of the inventive process, no particular restriction applies relative to the specific pH to which the slurry is adjusted, provided that it is comprised in the range of from 2 to 6. According to the present invention it is however specific that the pH in step (v) is adjusted to a value comprised in the range of from 3 to 5. According to particularly specific embodiments, however, the pH of the slurry is adjusted in step (v) to a value comprised in the range of from 3.5 to 4.5.

As for step (iv) of the inventive process, there is again no particular restriction relative to step (v) regarding the means of adjusting the pH to a value comprised in the range of from 2 to 6. Thus, in principle, any suitable means may be applied to this effect and in particular any suitable compounds and/or means may be chosen. Accordingly, Thus, in principle, any conceivable pH modifying agent and/or means and in particular any pH modifying compound specifically comprising one or more acids may be added to the slurry obtained in step (iv) to this effect. As regards the acids specifically employed to this effect, these may be acids of the Lewis and/or Bronsted type, wherein specifically the one or more acids used for adjustment of the pH in step (v) are selected from Bronsted acids.

According to particularly specific embodiments of the inventive process, the pH is adjusted in step (v) by the addition of one or more acids comprising one or more mono- and/or dicarboxylic acids. According to said specific embodiments, it is further specific that the one or more acids comprise one or more dicarboxylic acids. According to particularly specific embodiments of the inventive process, the pH is adjusted in step (v) by the addition of one or more dicarboxylic acids.

As regards the one or more monocarboxylic acids specifically employed in step (v) of the inventive process, no particular restriction applies relative to the type and/or number of the one or more carboxylic acids which may be employed to this effect provided that a value of the pH comprised in the range of from 2 to 6 may be achieved. Thus, by way of example, any one or more monocarboxylic acids selected from the group of optionally substituted and/or optionally branched ($C_1$-$C_{10}$) carboxylic acids may be employed to this effect including mixtures of two or more thereof. It is, however, specific according to the inventive process that the one or more carboxylic acids specifically used are selected from the group consisting of optionally substituted and/or optionally branched ($C_1$-$C_8$) carboxylic acids, more specifically from the group consisting of ($C_1$-$C_6$) carboxylic acids, and more specifically from the group of ($C_1$-$C_4$) carboxylic acids. According to particularly specific embodiments, the one or more monocarboxylic acids are selected from the group consisting of optionally substituted ($C_2$-$C_3$) carboxylic acids including mixtures of two or more thereof, wherein even more specifically the one or more monocarboxylic acids comprise optionally substituted acetic acid, and specifically unsubstituted acetic acid.

According to embodiments of the inventive process which are particularly specific, the pH in step (v) is adjusted by addition of optionally substituted acetic acid, and specifically unsubstituted acetic acid.

As noted above, however, it is further specific according to the inventive process that in step (v), the pH of the slurry is adjusted by addition of one or more dicarboxylic acids. Thus, as for the one or more monocarboxylic acids, there is accordingly no particular restriction relative to the type and/or number of the one or more dicarboxylic acids which may be employed to this effect. Thus, by way of example, the one or more dicarboxylic acids may be selected from the group consisting of ($C_2$-$C_{10}$) dicarboxylic acids including mixtures of two or more thereof, wherein specifically the one or more dicarboxylic acids are selected from the group consisting of optionally substituted and/or optionally branched ($C_2$-$C_8$) dicarboxylic acids. According to said embodiments it is yet further specific that the one or more dicarboxylic acids used for adjusting the pH of the slurry in step (v) is selected from the group consisting of optionally substituted and/or optionally branched ($C_3$-$C_6$) dicarboxylic acids including mixtures of any two or more thereof, and specifically from the group consisting of ($C_3$-$C_5$) dicarboxylic acids, and more specifically from the group of optionally substituted $C_4$-dicarboxylic acids including mixtures of two or more thereof. Thus, the particularly specific one or more dicarboxylic acids may comprise one or more selected from the group consisting of optionally substituted oxalic acid, malonic acid, succinic acid, glutaric acid, adipic acid, pimelic acid, suberic acid, azelaic acid, sebacic acid, phthalic acid, isophthalic acid, terephthalic acid, maleic acid, glutaconic acid, traumatic acid, muconic acid, and mixtures of two or more thereof, specifically from the group consisting of optionally substituted oxalic acid, malonic acid, succinic acid, glutaric acid, adipic acid, maleic acid, and mixtures of two or more thereof, wherein even more specifically the one or more dicarboxylic acids comprised optionally substituted succinic acid, and specifically substituted succinic acid.

As regards the particular embodiments of the inventive process wherein the specific one or more dicarboxylic acids employed in step (v) for adjusting the pH of the slurry wherein said one or more dicarboxylic acids are substituted, there is no particular restriction according to the present invention as to the one or more substituents which may be contained in one or more of the dicarboxylic acids. Same applies accordingly relative to the one or more monocarboxylic acids which may be employed for adjusting the pH in step (v) in addition to or instead of said aforementioned one or more dicarboxylic acids. Thus, by way of example, the one or more substituents in the one or more substituted dicarboxylic acids and/or monocarboxylic acids, and specifically in the one or more dicarboxylic acids may be selected from the group consisting of $(C_1-C_3)$alkyl, $(C_1-C_3)$ alkoxy, hydroxyl, halides, $(C_1-C_3)$carbonyl, $(C_1-C_3)$amine, and combinations of two or more thereof, specifically from the group consisting of $(C_1-C_2)$alkyl, $(C_1-C_2)$alkoxy, hydroxyl, chloro, bromo, fluoro, and combinations of two or more thereof, more specifically from the group consisting of methyl, hydroxyl, chloro, and combinations of two or more thereof, wherein even more specifically the one or more substituents comprises hydroxyl, and wherein even more specifically the one or more dicarboxylic acids comprise tartaric acid.

It is further specific according to the present invention that in addition to adjusting the pH of the slurry in step (v) of the inventive process, one or more alkaline earth elements are added to the slurry in said step. In particular, it is particularly specific that one or more alkaline earth elements are further added in step (v) of the inventive process said one or more alkaline earth elements specifically being selected from the group consisting of magnesium, calcium, strontium, barium, and any combinations of two or more thereof. According to particularly specific embodiments, the one or more alkaline earth elements further added in step (v) comprise barium, wherein even more specifically barium is added as the alkaline earth element in step (v).

Therefore, embodiments of the inventive process are specific, wherein one or more alkaline earth elements are further added in step (v).

As noted in the foregoing, no particular restriction applies according to the present invention relative to the amounts in which the materials may be employed in the inventive process provided that a catalyst may be produced, such that in principle any suitable amount of the one or more platinum group elements and the one or more alkaline earth elements added in one or more of steps (ii) to (v) may be employed. Thus, in principle, any conceivable ratio of the one or more materials and compounds provided in any of steps (ii) to (v) may be employed in the inventive process to this effect. Consequently, as regards the molar ratio of the total amount of the one or more platinum group elements to the total amount of the one or more alkaline earth elements added in one or more of the aforementioned steps, said molar ratio may adopt any suitable value. This applies in particular to the amount of the one or more platinum group elements added in step (ii) and optionally added in step (iii) as well as to the one or more alkaline earth elements added in step (iii) and optionally added in steps (iv) and/or (v). Thus, by way of example, the molar ratio of the total amount of the one or more platinum group elements added in step (ii) and optionally added in step (iii) to the total amount of the one or more alkaline earth elements added in step (iii) and optionally added in steps (iv) and/or (v) may be comprised in the range of from 1:(0.1-10). According to the present invention it is however specific that the aforementioned molar ratio lies in the range of from 1:(0.3-7), and more specifically in the range of from 1:(0.5-5), more specifically 1:(0.8-4), and even more specifically in the range of from 1:(0.95-3.5).

Therefore, embodiments of the present invention are specific, wherein the molar ratio of the total amount of the one or more platinum group elements added in step (ii) and optionally added in step (iii), to the total amount of the one or more alkaline earth elements added in step (iii), and optionally added in steps (iv) and/or (v) is comprised in the range of from 1:(0.1-10).

In step (vii) of the inventive process, the slurry obtained from the foregoing steps is provided onto the optionally coated substrate for obtaining a catalyst. Depending on the one or more particular support materials used for obtaining the aforementioned slurry, as well as the specific compounds and materials further used in steps (ii) to (v) of the inventive process, it may be desirable that the slurry is subjected to one or more further steps prior to preforming step (vii) of providing said slurry onto the substrate. Thus, by way of example, one or more additional compounds may be added to the slurry obtained in step (v) which may be beneficial for its provision onto the optionally coated substrate either with respect to the application of the slurry and/or with respect to its further processing such as with respect to any drying and/or calcination steps which may be conducted after step (vii). Furthermore, in addition to the possibility of adding one or more further compounds and/or materials to the slurry prior to step (vii), it may also be advantageous to subject the slurry to one or more treatment procedures for the same reasons and in particular depending on the applications for which the catalyst is intended. Thus, according to the present invention, an optional milling step (vi) may be performed to the slurry obtained in step (v) prior to step (vii). According to said specific embodiments, a milling step is performed in step (vi) for affording a particle size of the slurry comprised in the range of from 1 to 50 µm. According to the present invention, the term "particle size" specifically refers to the mean particle size of the slurry and more specifically to the particle size $D_{50}$. According to the present invention, it is further specific that the slurry obtained in step (v) is milled in step (vi) to a particle size in the range of from 3 to 30 µm, and more specifically of from 5 to 20 µm, and even more specifically of from 7 to 18 µm. According to particularly specific embodiments of the present invention, the slurry obtained in step (v) is milled in step (vi) to a particle size comprised in the range of from 8 to 16 µm. As for the adjustment of the pH in step (iv) of the inventive process, a step of milling in step (vi) of the inventive process must accordingly not be performed according to any of the particular and specific embodiments relative to the particle size of the slurry in instances wherein the slurry obtained in step (v) already displays the desired particle size according to any of the particular and specific embodiments.

Therefore, embodiments of the present invention are specific wherein the slurry obtained in step (v) is milled in step (vi) to a particle size in the range of from 1 to 50 µm, specifically of from 3 to 30 µm, more specifically of from 5 to 20 µm, more specifically of from 7 to 18 µm, and even more specifically in the range of from 8 to 16 µm.

Concerning the method in which the slurry obtained in step (v) or (vi) is provided onto the substrate in step (vii), any suitable method may be employed to this effect. Thus, by way of example, any spraying and/or dipping procedure or the like may be employed for providing the slurry onto the substrate. According to the present invention it is however specific that the slurry obtained in step (v) or (vi) is provided onto the substrate by a dipping procedure wherein specifically the substrate is at least partially immersed into the slurry as a result of which said slurry may be provided as washcoat onto the substrate. Optionally, after said coating procedure, excess slurry may be removed from the substrate by any mechanical and/or physical means such as by blowing excess slurry off the substrate with a compressed gas such as air and/or by centrifugation means or the like with which excess slurry may be removed.

Following step (vii), it is specific according to the inventive process that the catalyst obtained in step (vii) is further subject to a step of drying and/or calcination. According to a particularly specific embodiments of the inventive process, the catalyst obtained in step (vii) is subsequently subject to a step of drying followed by a calcination step.

Therefore, embodiments of the inventive process are specific wherein a step of drying and/or a calcination step is conducted after step (vii), specifically a step of drying followed by a calcination step.

According to the inventive process, steps (ii) to (vii) may be repeated one or more times for providing the optionally coated substrate of step (i) with two or more washcoat layers in addition to the initial coating which may optionally be present on the substrate. According to the present invention it is particularly specific that when steps (ii) to (vii) are repeated, also the specific steps and/or calcination and in particular both the specific steps of drying and calcination are equally repeated after step (vii). According to the present invention, there is no particular restriction as to the number of repetitions of steps (ii) to (vii) and in particular steps (ii) to (vii) including steps of drying and/or calcination following step (vii) provided that a catalyst may be obtained. According to particularly specific embodiments thereof, however, steps (ii) to (vii) specifically including drying and/or calcination are repeated twice for providing the optionally coated substrate of step (i) with three washcoat layers.

Therefore, embodiments of the inventive process are further specific wherein steps (ii) to (vii) are repeated one or more times for providing the optionally coated substrate of step (i) with two or more washcoat layers.

Further to the provision of a process for the preparation of a catalyst, the present invention also concerns a catalyst per se which is obtainable according to the inventive process and in particular according to any of the particular or specific embodiments thereof, and in particular to the catalyst per se which is obtained according to any of the particular or specific embodiments of the inventive process as defined in the present application.

Therefore, the present invention further relates to a catalyst comprising a substrate and a catalyst coating comprising one or more washcoat layers, said catalyst coating being provided on said substrate, wherein the catalyst is obtainable and/or obtained according to the inventive process and in particular according to any of the particular or specific embodiments thereof.

According to specific embodiments of the present invention, the one or more washcoat layers respectively contain one or more particulate support materials, wherein each of these support materials is loaded with both one or more platinum group elements and with one or more alkaline earth elements. In principle, no particular restriction applies relative to the type and/or amount of the one or more particulate support materials which may be employed in the inventive catalyst provided that it may suitably support both the one or more platinum group elements and the one or more alkaline earth elements. Accordingly, particulate support materials are specific according to the present invention which display a high surface area such as to facilitate the deposition of the platinum group element(s) and the alkaline earth element(s) thereon. Thus, by way of example, the one or more particulate support materials may be selected from the group consisting of alumina, titania, titania-alumina, zirconia, zirconia-alumina, baria-alumina, ceria, ceria-alumina, baria-ceria-alumina, lanthana-alumina, lanthana-zirconia-alumina, titania-zirconia, zeolites, and mixtures of two or more thereof, wherein the one or more particulate support materials specifically comprise alumina and/or zeolite, more specifically gamma-alumina and/or zeolite beta, and even more specifically comprise gamma-alumina doped with $SiO_2$.

Concerning the one or more platinum group elements supported on at least one of the one or more particulate support materials contained in the respective washcoat layers, there is in principle no particular restriction neither with respect to the number and/or type of platinum group elements which may be employed to this effect in the respective washcoat layers, nor with respect to the amount in which they are respectively loaded onto the one or more particulate support materials. Thus, in principle, any one or more platinum group elements selected from the group consisting of ruthenium, rhodium, palladium, osmium, iridium, platinum including combinations of two or more thereof may be supported on at least one of the one or more particulate support materials contained in the respective washcoat layers of the inventive catalyst, wherein it is however specific that the one or more platinum group elements comprise palladium and/or platinum and more specifically comprise palladium. According to particularly specific embodiments of the present invention, palladium and/or platinum, and specifically palladium is supported on the one or more particulate support materials as the platinum group element(s).

Therefore, embodiments of the inventive catalyst are specific, wherein the one or more platinum group elements supported on the one or more particulate support materials is selected from the group consisting of Ru, Rh, Pd, Os, Ir, Pt, and combinations of two or more thereof.

As regards the one or more alkaline earth elements supported on the one or more particulate support materials in addition to one or more platinum group elements according to any of the particular and specific embodiments defined in the present application, said one or more alkaline earth element is selected from the group consisting of magnesium, calcium, strontium, barium, and any combination of two or more thereof. According to particularly specific embodiments of the present invention, however, barium is contained as the alkaline earth element on the one or more particulate support materials in addition to the one or more platinum group elements. According to yet further specific embodiments of the inventive catalyst, barium is provided as the alkaline earth element on one or more particulate support materials in addition to palladium and/or platinum and specifically in addition to palladium as the one or more platinum group element(s).

Therefore, embodiments of the inventive catalyst are specific, wherein the one or more alkaline earth elements supported on the one or more particulate support materials is selected from the group consisting of Mg, Ca, Sr, Ba, and combinations of two or more thereof.

Regarding the molar ratio of the one or more platinum group elements to the one or more alkaline earth elements respectively supported on the one or more particulate support materials in the inventive catalyst, no particular restriction applies according to the present invention. Thus, by way of example, the molar ratio of the total amount of the one or more platinum group elements to the total amount of the one or more alkaline earth elements may range anywhere from 1:(0.1-10), wherein specifically said molar ratio ranges from 1:(0.3-7), and more specifically from 1:(0.5-5), more specifically 1:(0.8-4), and even more specifically in the range of from 1:(0.95-3.5). According to embodiments of the present invention which are yet further specific, the molar ratio of the total amount of the one or more platinum group elements to the total amount of the one or more alkaline earth elements respectively supported on the one or more particulate support materials is comprised in the range of from 1:(0.1-5), and more specifically in the range of from 1:(0.3-2), more specifically 1:(0.5-1.5), more specifically 1:(0.8-1.2), and even more specifically in the range of from 1:(0.9-1). In particular, the aforementioned molar ratios which are particularly specific according to the present invention apply with respect to specific embodiments of the inventive catalyst wherein palladium and/or platinum, and even more specifically both palladium and platinum are supported on the one or more particulate support materials as the one or more platinum group elements, wherein it is even further specific that according to said particular and specific embodiments barium is provided as the alkaline earth element supported on the one or more particulate support materials in addition to palladium and/or platinum, and in particular in addition to palladium supported thereon as the platinum group element.

According to yet further specific embodiments of the inventive catalyst, said catalyst comprises two or more washcoat layers wherein one or more washcoat layers comprises one or more particulate support materials supporting both platinum and palladium as the platinum group elements supported thereon in addition to one or more alkaline earth elements and specifically in addition to barium, and wherein one or more further washcoat layers comprise one or more particulate support materials supporting palladium as the platinum group element in addition to one or more alkaline earth elements and specifically in addition to barium. According to said particularly specific embodiments, the molar ratio of platinum and palladium contained in one or more of the two or more washcoat layers lies within the range according to any of the aforementioned particular and specific embodiments of the inventive catalyst and that the molar ratio of palladium in one or more further washcoat layers of the two or more washcoat layers to the one or more alkaline earth elements supported on the same one or more particulate support materials is comprised in the range of from 1:(0.5-7), and more specifically in the range of from 1:(1-5), more specifically 1:(2-4), more specifically 1:(3-3.5), and even more specifically in the range of from 1:(3.2-3.3). According to yet further specific embodiments of said particularly specific embodiments of the inventive catalyst, palladium is contained in two or more further layers as the platinum group element supported on one or more particulate support materials in addition to one or more alkaline earth elements in addition to the one or more washcoat layers containing platinum and palladium supported on one or more particulate support materials in addition to one or more alkaline earth elements. According to said particularly specific embodiments of the present invention, the molar ratio of palladium to the total amount of the alkaline earth elements and in particular to barium on the one or more particulate support materials in said two or more washcoat layers is comprised in the range of from 1:(0.5-40), and more specifically in the range of from 1:(1-30), more specifically 1:(2-25), more specifically 1:(3-20), more specifically 1:(4-17), and even more specifically in the range of from 1:(4.5-15).

According to the present invention and in particular according to any of the particular and specific embodiments defined in the present application wherein two or more platinum group elements are supported on the one or more particulate support materials in addition to one or more alkaline earth elements in a single washcoat layer, it is in principle possible that the two or more platinum group elements are supported on different types of particulate support materials and/or on the same type of particulate support materials yet on separate portions of said one or more particulate support materials. In addition thereto or instead, the two or more platinum group elements may be provided on the same particles of one or more particulate support materials. According to the present invention it is however particularly specific that according to particular and specific embodiments of the inventive catalyst wherein two or more platinum group elements are contained in one or more of the washcoat layers, at least part of the one or more particulate support materials support two or more of the platinum group elements on the same particles together with the one or more alkaline earth elements. Same applies accordingly relative to particular and specific embodiments of the present invention wherein two or more alkaline earth elements are contained in one or more of the washcoat layers.

As concerns the total amount of the one or more platinum group elements which may be coated onto the one or more particulate support materials contained in the one or more washcoat layers, no particular restriction applies according to the present invention such that in principle any conceivable loading of the one or more platinum group elements may be contained in the inventive catalyst. Same applies accordingly relative to the one or more alkaline earth elements loaded on the one or more particulate support materials and in particular which are loaded on the one or more particulate support materials in addition to said one or more platinum group elements. Thus, as regards the total amount of the one or more platinum group elements loaded on the one or more particulate support materials contained in the one or more washcoat layers, it may range anywhere from 0.5 to 300 g/ft$^3$, wherein specifically the total amount ranges from 1 to 200 g/ft$^3$, more specifically from 3 to 150 g/ft$^3$, more specifically from 5 to 100 g/ft$^3$, more specifically from 7 to 95 g/ft$^3$, and even more specifically from 8 to 90 g/ft$^3$ based on the volume of the catalyst.

Same applies accordingly to the total amount of the one or more alkaline earth elements loaded on the one or more particulate support materials contained in the one or more washcoat layers such that by way of example it may range from 0.001 to 0.3 g/in$^3$, wherein specifically the total amount of the one or more alkaline earth elements loaded on the one or more particulate support materials contained in the one or more washcoat layers and specifically the total amount thereof loaded on the one or more particulate support materials in addition to the one or more platinum group elements is comprised in the range of from 0.005 to 0.2 g/in$^3$, more specifically of from 0.01 to 0.15 g/in$^3$, more specifically of from 0.03 to 0.12 g/in$^3$, more specifically of from 0.05 to 0.1 g/in$^3$ based on the volume of the catalyst.

Concerning the average particle size of the one or more particulate support materials contained in the one or more washcoat layers of the inventive catalyst and in particular the average particle size of the one or more particulate support materials loaded with both one or more platinum group elements and with one or more alkaline earth elements, no particular restriction applies according to the present invention such that any conceivable average particle size may be employed provided that it is suited for the one or more washcoat layers contained in the inventive catalyst and in particular that at least a portion thereof is suited for supporting both one or more platinum group elements and one or more alkaline earth elements on individual particles of the one or more particulate support materials. Thus, by way of example, the average particle size of the one or more particulate support materials contained in the one or more washcoat layers of the inventive catalyst may range anywhere from 1 to 50 μm, wherein specifically the average particle size ranges from 3 to 30 μm, more specifically of from 5 to 20 μm, more specifically of from 7 to 18 μm, and even more specifically in the range of from 8 to 16 μm.

Concerning the total number of washcoat layers which may be contained in the inventive catalyst, as noted with respect to the inventive process, no particular restriction applies according to the present invention provided that, depending on the substrate which is employed according to any of the particular and specific embodiments of the present invention, a catalyst is obtained which may be employed in the catalytic conversion of one or more chemical compounds depending on the specific application in which it is used. According to the present invention it is however specific that the catalyst coating comprises two or more washcoat layers, wherein more specifically the catalyst comprises two or three washcoat layers respectively containing the one or more particulate support materials loaded with both one or more platinum group elements and with one or more alkaline earth elements according to any of the particular and specific embodiments of the present invention.

With respect to the particular and specific embodiments of the inventive catalyst comprising two or more washcoat layers, and in particular regarding those particular and specific embodiments of the present invention wherein the individual washcoat layers do not contain the same type and/or number of platinum group elements, no particular restrictions apply in principle relative to the order in which said two or more washcoat layers are contained in the catalyst coating. Thus, the individual washcoat layers may be provided on different portions of the substrate and/or may be provided as first, second, and further washcoat layers on top of each other in a multilayered structure. Thus, according to particularly specific embodiments of the inventive catalyst wherein two or more washcoat layers are contained in the catalyst coating, one of the washcoat layers comprising platinum and palladium and the second washcoat layer comprising palladium, said washcoat layers are at least in part provided on top of one another for forming a multilayer structure on the catalyst substrate, wherein even more specifically the washcoat layer comprising palladium is contained therein as a first washcoat layer and the washcoat layer comprising platinum and palladium is contained therein as a second washcoat layer provided thereon. Same applies accordingly relative to specific embodiments of the present invention comprising three or more washcoat layers in the catalyst coating. Thus, as concerns particularly specific embodiments of the inventive catalyst as defined in the present application wherein the catalyst coating comprises one washcoat layer comprising platinum and palladium in addition to two further distinct washcoat layers comprising palladium, there is no particular restriction regarding the fashion in which these are contained in the inventive catalyst wherein at least a portion thereof is provided on top of one another for providing a multi-layer catalyst structure containing three washcoat layers provided on top of one another.

According to said embodiments of the present invention wherein at least a portion of the substrate is covered by said three washcoat layers according to particular and specific embodiments of the present invention in a multilayer fashion, it is particularly specific that the first washcoat layer comprises palladium, the second washcoat layer provided on the first washcoat layer comprises platinum and palladium and the third washcoat layer accordingly comprises palladium.

Therefore, it is particularly specific according to the present invention that the catalyst coating comprises a first washcoat layer comprising palladium, and a second washcoat layer provided thereon comprising platinum and palladium. According to yet further specific embodiments of the present invention, the catalyst coating further comprises a third washcoat layer comprising palladium provided on the first and second washcoat layers.

As for the inventive process, there is no particular restriction as to the catalyst substrate which may be employed in the inventive catalyst. Thus, any suitable catalyst substrate may be employed, wherein specifically a catalyst substrate according to any of the particular and specific embodiments relative to the inventive process as defined in the present application is contained as catalyst substrate in the inventive catalyst.

Therefore, embodiments of the inventive catalyst are specific, wherein the catalyst substrate is a monolith substrate, specifically a flow-through or wall-flow monolith substrate, more specifically a flow-through monolith substrate, wherein the monolith substrate is specifically a honeycomb substrate.

In addition to the inventive process and the inventive catalyst as defined in the present application, the present invention further relates to a process for the treatment of exhaust gas using the inventive catalyst, and in particular using a catalyst according to any of the particular and specific embodiments of the present invention. In principle, the inventive catalyst may be used in any conceivable application wherein one or more of its components display a catalytic activity relative to the conversion of one or more chemical compounds. It is, however, particularly specific according to the present invention that the inventive catalyst as defined in any of the particular and specific embodiments is employed for the treatment of exhaust gas. There is no particular restriction according to said specific embodiments neither with respect to the amounts nor with respect to the types of exhaust gas which may be treated using the inventive catalyst, such that exhaust gas from stationary sources such as exhaust gas from industrial applications may be treated as well as exhaust gas from automotive sources. According to particularly specific embodiments of the present invention, the inventive catalyst is used for the treatment of automotive exhaust gas, wherein said exhaust gas is such as from gasoline engines or diesel engines. It is, however, specific according to the present invention that the inventive catalyst is used for the treatment of automotive exhaust gas from lean burn engines and in particular from diesel engines. According to particularly specific embodiments, the inventive catalyst according to any of the particular or specific embodiments is used as a diesel oxidation catalyst.

Therefore, specific embodiments of the inventive process for the treatment of exhaust gas using the inventive catalyst involve the treatment of automotive exhaust gas, more specifically the treatment of automotive exhaust gas from a diesel engine, and even more specifically wherein the inventive catalyst is a diesel oxidation catalyst.

FIG. 1 displays results from light-off testing with respect to the conversion of CO in exhaust gas using catalyst samples as obtained from Examples 3 and 4 and the Comparative Example, which have been subject to an ageing procedure. In FIG. 1, the CO conversion in % is plotted on the y-axis, and the temperature in ° C. is plotted along the x-axis. The light off temperature of the respective catalyst samples are indicated by a vertical line showing the temperature at which 50% conversion of CO is achieved. The results for the sample from Example 3 is indicated by "●", for the sample from Example 4 by "+", and for the sample from the Comparative Example by "○".

EXAMPLES

Example 1

Preparation of an Oxidation Catalyst Containing Two Washcoat Layers

For the $1^{st}$ (bottom) layer 1.5 $g/in^3$ of high porous γ-alumina doped with 5% silica was impregnated with an aqueous solution of palladium nitrate giving a final dry Pd content of 30 $g/ft^3$. The resulting powder was dispersed in water. Subsequently water was added to obtain a solids content of 60% and barium hydroxide is added until pH 8 was established. Platinum solution with platinum as an ammine stabilized hydroxo Pt IV complex was added to give a dry content of Pt 60 $g/ft^3$. Afterwards the slurry is acidified with acetic acid, tartaric acid and barium nitrate to establish a pH of 4. After adjusting the pH of the slurry to 4.5 the slurry was milled to a particle size $d_{90}$ of 16 μm and 5% sugar is added. The slurry is then subsequently coated onto a monolith, dried at 110° C. air and calcined at 450° C. in air.

For the $2^{nd}$ (top) layer 0.75 $g/in^3$ high porous γ-alumina doped with 5% silica was dispersed in water and acid (e.g. acetic acid) and milled to a particle size $d_{90}$ of 20 micrometer. To this slurry a palladium nitrate solution was added to give a concentration of 30 $g/ft^3$ palladium. Subsequently water was added to obtain a solids content of 60% and barium hydroxide is added until pH 8 was established. Afterwards the slurry is acidified with acetic acid, tartaric acid and barium nitrate to establish a pH of 4. The sum of barium hydroxide and barium nitrate corresponds to 0.1 g/cinch of BaO. Finally, 0.5 $g/in^3$ H-beta zeolite and 5% sugar, was immersed in the slurry and a solid content of 45% was adjusted using de-ionized water milled to a particle size $d_{90}$ of 15 μm and subsequently coated onto the $1^{st}$ layer, dried at 110° C. air and calcined at 450° C. in air.

Example 2

Preparation of an Oxidation Catalyst Containing Two Washcoat Layers

For the $1^{nd}$ (bottom) layer 1.5 $g/in^3$ of high porous γ-alumina was impregnated with an aqueous solution of palladium nitrate giving a final dry Pd content of 30 $g/ft^3$. The resulting powder was dispersed in water. Subsequently water was added to obtain a solids content of 60% and barium hydroxide is added until pH 8 was established. Platinum solution with platinum as an amine stabilized hydroxo Pt IV complex was added to give a dry content of Pt 60 $g/ft^3$. Afterwards the slurry is acidified with acetic acid, tartaric acid and barium nitrate to establish a pH of 4. After adjusting the pH of the slurry to 4.5 the slurry was milled to a particle size $d_{90}$ of 16 μm and 5% sugar is added. The slurry is then subsequently coated onto a monolith, dried at 110° C. air and calcined at 450° C. in air.

For the $2^{nd}$ (top) layer 0.25 $g/in^3$ high porous γ-alumina was impregnated with palladium nitrate solution to give a concentration of 30 $g/ft^3$ palladium. Subsequently water was added to obtain a solids content of 60% and barium hydroxide is added until pH 8 was established. Afterwards the slurry is acidified with acetic acid, tartaric acid and barium nitrate to establish a pH of 4. To this slurry 0.5 $g/in^3$ OSC material ($ZrO_2$: 43.5 wt %, $CeO_2$: 45 wt %, $La_2O_3$: 8 wt %, $Pr_6O_{11}$: 2 wt %, $HfO_2$: 1.5%) is added and acid (e.g. acetic acid) to obtain pH 4. The slurry is and milled to a particle size $d_{90}$ of 15 micrometer. 0.5 $g/in^3$ H-beta zeolite, was immersed in the slurry and de-ionized water was added to obtain a solid content to 45%. The slurry is then subsequently coated onto the $1^{st}$ layer, dried at 110° C. air and calcined at 450° C. in air.

The oxidation catalyst of Example 2 had a catalyst volume of 1.24 l containing 60 $g/ft^3$ Pd and 60 $g/ft^3$ Pt.

Example 3

Preparation of an Oxidation Catalyst Containing Three Washcoat Layers

For the $1^{st}$ (bottom) layer 0.25 $g/in^3$ high porous γ-alumina was impregnated with an aqueous solution of palladium nitrate giving a final dry Pd content of 22 $g/ft^3$. To this mixture water was added to obtain a solids content of 60%. Afterwards barium hydroxide is added to until pH 8 was established. Subsequently the slurry is acidified with acetic acid, tartaric acid and barium nitrate to establish pH 4. The sum of barium hydroxide and barium nitrate corresponds to 0.1 g/cinch of BaO. To the slurry 0.5 $g/in^3$ OSC material ($ZrO_2$: 43.5 wt %, $CeO_2$: 45 wt %, $La_2O_3$: 8 wt %, $Pr_6O_{11}$: 2 wt %, $HfO_2$: 1.5%) and 0.25 OSC material ($ZrO_2$: 58 wt %, $CeO_2$: 28 wt %, $Nd_2O_3$: 7 wt %, $Pr_6O_{11}$: 7 wt %) were dispersed in water and acid (e.g. acetic acid) to establish pH 4. This suspension was milled to a particle size $d_{90}$ of 8 micrometer. The final slurry was coated onto a monolith, dried at 110° C. air and calcined at 450° C. in air.

For the $2^{nd}$ (middle) layer 1.5 $g/in^3$ of high porous γ-alumina was impregnated with an aqueous solution of palladium nitrate giving a final dry Pd content of 30 $g/ft^3$. The resulting powder was dispersed in water. Subsequently water was added to obtain a solids content of 60% and barium hydroxide is added until pH 8 was established. Platinum solution with platinum as an ammine stabilized hydroxo Pt IV complex was added to give a dry content of Pt 60 $g/ft^3$. Afterwards the slurry is acidified with acetic acid, tartaric acid and barium nitrate to establish a pH of 4. After adjusting the pH of the slurry to 4.5 the slurry was milled to a particle size $d_{90}$ of 16 μm and 5% sugar is added. The slurry is then subsequently coated onto the $1^{St}$ layer, dried at 110° C. air and calcined at 450° C. in air.

For the $3^{rd}$ (top) layer 0.25 $g/in^3$ high porous γ-alumina and 0.5 $g/in^3$ OSC material ($ZrO_2$: 43.5 wt %, $CeO_2$: 45 wt %, $La_2O_3$: 8 wt %, $Pr_6O_{11}$: 2 wt %, $HfO_2$: 1.5%) were dispersed in water and acid (e.g. acetic acid) and milled to a particle size $d_{90}$ of 20 micrometer. 0.5 $g/in^3$ H-beta zeolite, was immersed in water to a solid content to 45%. To this slurry a palladium nitrate solution was added to give a concentration of 8 $g/ft^3$ palladium. The precious metal containing slurry was mixed with the alumina slurry, milled to a particle size $d_{90}$ of 15 μm and subsequently coated onto the $2^{nd}$ layer, dried at 110° C. air and calcined at 450° C. in air.

Example 4

Preparation of an oxidation catalyst containing three washcoat layers

For the $1^{st}$ (bottom) layer 0.85 g/in³ high porous γ-alumina doped with 5% silica was impregnated with an aqueous solution of palladium nitrate giving a final dry Pd content of 22 g/ft³. To this mixture water was added to obtain a solids content of 60%. Afterwards barium hydroxide is added to until pH 8 was established. Subsequently the slurry is acidified with acetic acid, tartaric acid and barium nitrate to establish pH 4. The sum of barium hydroxide and barium nitrate corresponds to 0.1 g/cinch of BaO. This suspension was milled to a particle size $d_{90}$ of 8 micrometer. The final slurry was coated onto a monolith, dried at 110° C. air and calcined at 450° C. in air.

For the $2^{nd}$ (middle) layer 1.5 g/in³ of high porous γ-alumina doped with 5% silica was impregnated with an aqueous solution of palladium nitrate giving a final dry Pd content of 30 g/ft³. The resulting powder was dispersed in water. Subsequently water was added to obtain a solids content of 60% and barium hydroxide is added until pH 8 was established. Platinum solution with platinum as an ammine stabilized hydroxo Pt IV complex was added to give a dry content of Pt 60 g/ft³. Afterwards the slurry was acidified with acetic acid, tartaric acid and barium nitrate to establish a pH of 4. After adjusting the pH of the slurry to 4.5 the slurry was milled to a particle size $d_{90}$ of 16 μm and 5% sugar is added. The slurry is then subsequently coated onto the $1^{st}$ layer, dried at 110° C. air and calcined at 450° C. in air.

For the $3^{nd}$ (top) layer 0.75 g/in³ high porous γ-alumina doped with 5% silica was dispersed in water and acid (e.g. acetic acid) and milled to a particle size $d_{90}$ of 20 micrometer. To this slurry a palladium nitrate solution was added to give a concentration of 30 g/ft³ palladium. Subsequently water was added to obtain a solids content of 60% and barium hydroxide is added until pH 8 was established. Afterwards the slurry is acidified with acetic acid, tartaric acid and barium nitrate to establish a pH of 4. The sum of barium hydroxide and barium nitrate corresponds to 0.1 g/cinch of BaO. Finally, 0.5 g/in³ H-beta zeolite and 5% sugar, was immersed in the slurry and a solid content of 45% was adjusted using de-ionized water, milled to a particle size $d_{90}$ of 15 μm and subsequently coated onto the $2^{nd}$ layer, dried at 110° C. air and calcined at 450° C. in air.

Example 5

Preparation of an Oxidation Catalyst Containing Two Washcoat Layers

For the $1^{st}$ (bottom) layer 1.5 g/in³ of high porous γ-alumina doped with 5% silica was impregnated with an aqueous solution of palladium nitrate giving a final dry Pd content of 30 g/ft³. The resulting powder was dispersed in water. Water was then added to obtain a solids content of 60%. Subsequently, a platinum solution with platinum as an ammine stabilized hydroxo Pt IV complex was added to give a dry Pt content of 60 g/ft³. Afterwards the impregnated powder was calcined for 2 h at 590° C. After calcination, water was added to obtain a solids content of 40% and the pH of the slurry was adjusted to 4.5 with nitric acid. Finally, the slurry was milled to a particle size $d_{90}$ of 16 μm and 5% sugar was added. The slurry was then subsequently coated onto a monolith, dried at 110° C. air and calcined at 450° C. in air.

For the $2^{nd}$ (top) layer, 0.75 g/in³ of high porous γ-alumina doped with 5% silica was dispersed in water and acid (e.g. acetic acid) and milled to a particle size $d_{90}$ of 20 micrometer. To this slurry a palladium nitrate solution was added to give a concentration of 30 g/ft³ palladium. Afterwards the powder was calcined for 2 h at 590° C. After the calcination water was added to obtain a solids content of 40% and barium hydroxide was added until pH 8 was established. Afterwards the slurry was acidified with nitric acid to obtain a pH of 4. Finally, 0.5 g/in³ H-beta zeolite and 5% sugar were immersed in the slurry and the solid content was adjusted to 45% using de-ionized water. The slurry was then milled to a particle size $d_{90}$ of 15 μm and subsequently coated onto the $1^{st}$ layer, dried at 110° C. air and calcined at 450° C. in air.

Comparative Example

Preparation of an oxidation catalyst containing three washcoat layers

For the $1^{st}$ (bottom) layer 0.85 g/in³ high porous γ-alumina doped with 5% silica was impregnated with an aqueous solution of palladium nitrate giving a final dry Pd content of 22 g/ft³. To this mixture water was added to obtain a solids content of 60%. Afterwards the slurry is acidified with tartaric acid to establish pH 4. This suspension was milled to a particle size $d_{90}$ of 8 micrometer. After milling the pH was adjusted to pH 5.5 with monoethanolamine. The so obtained slurry was coated onto a monolith, dried at 110° C. air and calcined at 450° C. in air.

For the $2^{nd}$ (middle) layer 1.5 g/in³ of high porous γ-alumina doped with 5% silica was impregnated with an aqueous solution of an ammine stabilized hydroxo Pt IV complex to give a dry content of Pt 60 g/ft³. To this mixture a palladium nitrate solution was added giving a final dry Pd content of 30 g/ft³. The resulting powder was dispersed in water to a solids content of 30% and the pH was adjusted to pH 4 using tartaric acid. This suspension was milled to a particle size $d_{90}$ of 15 micrometer. After milling the pH was adjusted to pH 5.5 with monoethanolamine and 5% sugar is added. The slurry is then subsequently coated onto the $1^{st}$ layer, dried at 110° C. air and calcined at 450° C. in air.

For the $3^{rd}$ (top) layer a palladium nitrate solution was added to 0.75 g/in³ high porous γ-alumina doped with 5% silica to give a concentration of 30 g/ft³ palladium. This mixture was dispersed in water and tartaric acid to obtain a solids content of 35% at a pH of 4. Subsequently the slurry was milled to a particle size $d_{90}$ of 12 micrometer. After milling the pH was increased to 6 with a monoethanol solution and 0.5 g/in³ of H-beta zeolite and 5% sugar, was immersed in the slurry. The solid content at this stage of preparation is 45% and was adjusted using de-ionized water. This slurry is used for coating onto the $2^{nd}$ layer, dried at 110° C. air and calcined at 450° C. in air.

The oxidation catalyst of Example 5 had a catalyst volume of 1.24 l containing 60 g/ft³ Pd and 60 g/ft³ Pt.

Light-Off Performance and HC Conversion Testing

The catalysts obtained in Examples 2 to 5 as well as the catalyst obtained from the Comparative Example were respectively aged for 20 h at 750° C. The aged catalysts were then tested with respect to their light-off characteristics relative to the conversion of CO in exhaust gas. The results of catalyst testing performed for Examples 3 and 4 and for the Comparative Example are displayed in FIG. 1.

Furthermore, the diesel oxidation catalyst samples obtained from Examples 2 and 5 were tested relative to their hydrocarbon conversion efficiency. The results obtained from catalyst testing performed for Examples 2 and 5 relative to their light-off performance as well as with respect to their hydrocarbon conversion efficiency are displayed in Tables 1 and 2 below, respectively.

TABLE 1

Catalyst testing results obtained for Example 2.

| Catalyst inlet temperature [° C.] | HC conversion [%] | CO conversion [%] |
|---|---|---|
| 123 | 64 | 5 |
| 136 | 60 | 4 |
| 145 | 55 | 8 |
| 154 | 48 | 8 |
| 163 | 43 | 10 |
| 171 | 39 | 15 |
| 178 | 36 | 25 |
| 186 | 39 | 66 |
| 202 | 60 | 96 |
| 212 | 69 | 98 |
| 226 | 81 | 99 |
| 234 | 83 | 100 |
| 247 | 85 | 100 |
| 267 | 90 | 100 |
| 273 | 91 | 100 |
| 277 | 92 | 100 |
| 291 | 92 | 100 |

TABLE 2

Catalyst testing results obtained for Example 5.

| Catalyst inlet temperature [° C.] | HC conversion [%] | CO conversion [%] |
|---|---|---|
| 132 | 62 | 10 |
| 139 | 58 | 7 |
| 145 | 54 | 6 |
| 152 | 48 | 6 |
| 161 | 42 | 5 |
| 169 | 36 | 8 |
| 177 | 34 | 12 |
| 187 | 29 | 25 |
| 197 | 31 | 53 |
| 206 | 48 | 84 |
| 220 | 65 | 96 |
| 233 | 76 | 99 |
| 246 | 81 | 99 |
| 259 | 83 | 99 |
| 271 | 86 | 100 |
| 286 | 90 | 100 |
| 296 | 90 | 100 |

Thus, as may be taken from the results of the catalyst testing displayed in FIG. 1, the inventive catalyst samples prepared according to the inventive method display considerably lower light-off temperatures. This applies accordingly with respect to the T50 values displayed in Tables 1 and 2 for Examples 2 and 5, respectively, which lie in the range of 178 to 197° C. compared to the T50 value of around 210° C. observed for the sample obtained from the Comparative Example. Without being bound to theory, it is assumed that the inventive process surprisingly leads to a higher dispersion of the platinum group elements onto the respective support materials, as a result of which an increased performance, and in particular, an improved resistance to ageing may be achieved. In particular, it is assumed that also a higher fixation of the platinum group metal may be achieved by the inventive process, as a result of which the migration of the platinum group metal during catalyst ageing is effectively suppressed.

This effect may also be observed upon comparison of the results obtained for Examples 2 and 5 as respectively displayed in Tables 1 and 2. More specifically, it is noted that the according that both examples relate to diesel oxidation catalysts with two layers and having the same loading of Pt and Pd in the respective layers. As opposed to the sample of Example 2, however, in which both layers are produced according to the inventive process, in the sample according to Example 5 only the second layer was prepared according to the inventive process. In particular, as may be observed from the comparison of the values obtained from catalytic testing displayed in Tables 1 and 2, the sample from Example 2 displays an improved performance with respect to both hydrocarbon (HC) and CO conversion, the respective T50 values being observed at lower temperatures compared to the respective values obtained for the diesel oxidation catalyst according to Example 5.

Nevertheless, the results obtained for Example 5 demonstrate that even when applied to a single washcoat layer of a multi-layer diesel oxidation catalyst, the inventive process allows for the production of a diesel oxidation catalyst with improved catalytic properties, in particular with respect to the light-off temperatures which may be achieved despite of the catalyst aging under normal conditions of use.

What is claimed is:

1. A diesel oxidation catalyst comprising a substrate and a catalyst coating comprising three or more washcoat layers respectively containing one or more particulate support materials loaded with both one or more platinum group elements and with one or more alkaline earth elements, said catalyst coating being provided on said substrate, wherein the catalyst is obtained by a process comprising:
   (i) providing a substrate which is optionally coated with one or more coating layers;
   (ii) impregnating one or more particulate support materials with one or more platinum group elements;
   (iii) adding one or more alkaline earth elements and one or more solvents to the product obtained in step (ii) to obtain a slurry;
   (iv) adjusting the pH of the slurry obtained in step (iii) to a value comprised in the range of from 7 to 10, in case the pH should not fall within this range;
   (v) adjusting the pH of the slurry to a value comprised in the range of from 2 to 6;
   (vi) optionally milling the slurry obtained in step (v); and
   (vii) providing the slurry obtained in step (vi) onto the optionally coated substrate in one or more coating steps;
   wherein the catalyst coating comprises a first washcoat layer comprising Pd, a second washcoat layer provided thereon comprising Pt and Pd, and a third washcoat layer comprising Pd provided on the first and second washcoat layers,
   wherein the catalyst does not comprise Rh,
   wherein the catalyst is capable of converting at least 50% of carbon monoxide in an exhaust gas at a temperature below 210° C. after an aging process, and
   wherein at least the second washcoat layer is prepared by adding Pt after step (iv) and prior to step (v).

2. The catalyst of claim 1, wherein the molar ratio of the total amount of the one or more platinum group elements to the total amount of the one or more alkaline earth elements respectively supported on the one or more particulate support materials is comprised in the range of from 1:(0.1-10).

3. The catalyst of claim 1, wherein the one or more alkaline earth elements supported on the one or more particulate support materials is selected from the group consisting of Mg, Ca, Sr, Ba, and combinations of two or more thereof.

4. The catalyst of claim 1, wherein the one or more particulate support materials loaded with both one or more platinum group elements and with one or more alkaline earth elements is selected from the group consisting of alumina, titania, titania-alumina, zirconia, zirconia-alumina, baria-alumina, ceria, ceria-alumina, baria-ceria-alumina, lanthana-alumina, lanthana-zirconia-alumina, titania-zirconia, zeolites, and mixtures of two or more thereof.

5. The catalyst of claim 1, wherein the total amount of the three or more platinum group elements loaded on the one or more particulate support materials contained in the one or more washcoat layers is comprised in the range of from 0.5 to 300 g/ft$^3$.

6. The catalyst of claim 1, wherein the total amount of the one or more alkaline earth elements loaded on the one or more particulate support materials contained in the three or more washcoat layers is comprised in the range of from 0.001 to 0.3 g/in$^3$.

7. The catalyst of claim 1, wherein the average particle size of the one or more particulate support materials loaded with both one or more platinum group elements and with one or more alkaline earth elements is comprised in the range of from 1 to 50 μm.

8. The catalyst of claim 1, wherein the catalyst substrate is a monolith substrate.

9. A method of treating exhaust gas, the method comprising contacting an exhaust gas stream with the catalyst of claim 1.

10. A diesel oxidation catalyst comprising a substrate and a catalyst coating on the substrate, the catalyst coating comprising three or more washcoat layers, each comprising one or more particulate support materials loaded with both one or more platinum group elements and with one or more alkaline earth elements, wherein the catalyst is obtained by a process comprising:
(i) providing a substrate which is optionally coated with one or more coating layers;
(ii) impregnating one or more particulate support materials with one or more platinum group elements;
(iii) adding one or more alkaline earth elements and one or more solvents to the product obtained in (ii) to obtain a slurry;
(iv) adjusting the pH of the slurry obtained in (iii) to a value comprised in the range of from 7 to 10, in case the pH should not fall within this range;
(v) adjusting the pH of the slurry to a value comprised in the range of from 2 to 6;
(vi) optionally milling the slurry obtained in (v); and
(vii) providing the slurry obtained in (vi) onto the optionally coated substrate in one or more coating stages;
wherein the catalyst coating comprises a first washcoat layer comprising Pd, a second washcoat layer comprising Pt and Pd, directly on and contacting the first washcoat layer, and a third washcoat layer comprising Pd provided on the first and second washcoat layers, wherein the catalyst does not comprise Rh, and wherein at least the second washcoat layer is prepared by adding Pt after step (iv) and prior to step (v).

11. The catalyst of claim 1, wherein the total amount of the Pt loaded on the one or more particulate support materials in the second washcoat layer is from 8 to 300 g/ft$^3$, and wherein the total amount of the Pd loaded on the one or more particulate support materials in the second washcoat layer is from 8 to 300 g/ft$^3$.

12. The catalyst of claim 10, wherein the total amount of the Pt loaded on the one or more particulate support materials in the second washcoat layer is from 8 to 300 g/ft$^3$, and wherein the total amount of the Pd loaded on the one or more particulate support materials in the second washcoat layer is from 8 to 300 g/ft$^3$.

13. The catalyst of claim 1, wherein the catalyst is capable of undergoing an aging process comprising aging at 750° C. for 20 hours and then of converting at least 50% of carbon monoxide in an exhaust gas at a temperature below 210° C.

14. The catalyst of claim 1, wherein the second washcoat layer comprises an oxygen storage component.

15. The catalyst of claim 1, wherein the third washcoat layer does not comprise an oxygen storage component.

16. A process for the preparation of the catalyst of claim 1, said process comprising:
(i) providing a substrate which is optionally coated with one or more coating layers;
(ii) impregnating one or more particulate support materials with one or more platinum group elements;
(iii) adding one or more alkaline earth elements and one or more solvents to the product obtained in step (ii) to obtain a slurry;
(iv) adjusting the pH of the slurry obtained in step (iii) to a value comprised in the range of from 7 to 10, in case the pH should not fall within this range;
(v) adjusting the pH of the slurry to a value comprised in the range of from 2 to 6;
(vi) optionally milling the slurry obtained in step (v);
(vii) providing the slurry obtained in step (vi) onto the optionally coated substrate in one or more coating steps,
wherein the catalyst is capable of undergoing an aging process and then of converting at least 50% of carbon monoxide in an exhaust gas at a temperature below 210° C., and
wherein at least the second washcoat layer is prepared by adding Pt after step (iv) and prior to step (v).

17. The process of claim 16, wherein the impregnation in step (ii) is achieved by incipient wetness.

18. The process of claim 16, wherein the one or more coating layers on the substrate provided in step (i) comprise one or more washcoat layers.

19. The process of claim 16, wherein the one or more particulate support materials is selected from the group consisting of alumina, titania, titania-alumina, zirconia, zirconia-alumina, baria-alumina, ceria, ceria-alumina, baric-ceria-alumina, lanthana-alumina, lanthana-zirconia-alumina, titania-zirconia, zeolites, and mixtures of two or more thereof.

20. The process of claim 16, wherein the one or more alkaline earth elements added in step (iii) is/are selected from the group consisting of Mg, Ca, Sr, Ba, and combinations of two or more thereof.

21. The process of claim 16, wherein the one or more solvents added in step (iii) comprise water.

22. The process of claim 16, wherein one or more further platinum group elements is/are added after step (iv) and prior to step (v).

23. The process of claim 16, wherein in step (iv) the pH is adjusted to a value comprised in the range of from 7.5 to 9.

24. The process of claim 16, wherein in step (iv) the pH is adjusted by addition of one or more bases.

25. The process of claim 16, wherein the pH in step (v) is adjusted to a value comprised in the range of from 3 to 5.

26. The process of claim 16, wherein in step (v) the pH is adjusted by addition of one or more acids.

27. The process of claim 26, wherein the one or more acids comprise one or more monocarboxylic acids selected from the group consisting of optionally substituted and/or optionally branched ($C_1$-$C_{10}$) carboxylic acids and mixtures of two or more thereof.

28. The process of claim 26, wherein the one or more acids comprise one or more dicarboxylic acids selected from the group consisting of ($C_2$-$C_{10}$) dicarboxylic acids and mixtures of two or more thereof.

29. The process of claim 28, wherein the one or more dicarboxylic acids are substituted with one or more substituents selected from the group consisting of ($C_1$-$C_3$)alkyl, ($C_1$-$C_3$)alkoxy, hydroxyl, halides, ($C_1$-$C_3$)carbonyl, ($C_1$-$C_3$) amine, and combinations of two or more thereof.

30. The process of claim 16, wherein one or more alkaline earth elements are further added in step (v).

31. The process of claim 16, wherein the molar ratio of the total amount of the one or more platinum group elements added in step (ii) and optionally added in step (iii), to the total amount of the one or more alkaline earth elements added in step (iii), and optionally added in steps (iv) and/or (v) is comprised in the range of from 1:(0.1-10).

32. The process of claim 16, wherein the slurry obtained in step (v) is milled in step (vi) to a particle size in the range of from 1 to 50 μm.

33. The process of claim 16, wherein a step of drying and/or a calcination step is conducted after step (vii).

34. The process of claim 16, wherein steps (ii) to (vii) are repeated one or more times for providing the optionally coated substrate of step (i) with two or more washcoat layers.

35. The process of claim 16, wherein the optionally coated substrate provided in step (i) is a monolith substrate.

* * * * *

UNITED STATES PATENT AND TRADEMARK OFFICE
CERTIFICATE OF CORRECTION

PATENT NO.         : 10,464,052 B2
APPLICATION NO.    : 14/076663
DATED              : November 5, 2019
INVENTOR(S)        : Marcus Hilgendorff et al.

Page 1 of 1

It is certified that error appears in the above-identified patent and that said Letters Patent is hereby corrected as shown below:

In the Specification

Column 2, Line 18, delete "and or" and insert -- and/or --

Column 7, Line 54, delete "alumosilicate" and insert -- aluminosilicate --

In the Claims

Column 25, Line 56, delete "1$^{nd}$" and insert -- 1$^{st}$ --

Column 32, Line 52, delete "baric-" and insert -- baria --

Signed and Sealed this
Tenth Day of March, 2020

Andrei Iancu
*Director of the United States Patent and Trademark Office*